United States Patent
Li et al.

(10) Patent No.: US 6,994,405 B2
(45) Date of Patent: Feb. 7, 2006

(54) AXLE ASSEMBLY

(75) Inventors: Xiao-Ming Li, Canton, MI (US); Michael Wayne Johnston, Alexander City, AL (US); Vincent Joseph Genise, Novi, MI (US)

(73) Assignee: Citation Corporation, Birmingham, AL (US)

( * ) Notice: Subject to any disclaimer, the term of this patent is extended or adjusted under 35 U.S.C. 154(b) by 88 days.

(21) Appl. No.: 10/696,855

(22) Filed: Oct. 30, 2003

(65) Prior Publication Data

US 2005/0093364 A1 May 5, 2005

(51) Int. Cl.
*B60B 35/00* (2006.01)

(52) U.S. Cl. .................. 301/124.1; 301/137; 180/258; 384/583

(58) Field of Classification Search .............. 301/124.1, 301/125, 137, 64.7, 65; 74/606, 607; 180/258, 180/276, 385, 252, 253, 259; 384/583; 475/230; 411/510; 29/463; 280/124.175, 124.1, 124.151
See application file for complete search history.

(56) References Cited

U.S. PATENT DOCUMENTS

| | | | | |
|---|---|---|---|---|
| 1,209,134 A | * | 12/1916 | Dodge | 74/607 |
| 1,439,787 A | | 12/1922 | Beechler | |
| 1,734,709 A | | 11/1929 | Bayley | |
| 1,841,418 A | | 1/1932 | Scott | |
| 2,075,563 A | | 3/1937 | Alden | |
| 2,911,262 A | | 11/1959 | Franck | |
| 3,726,154 A | * | 4/1973 | Diessner | 74/607 |
| 3,801,124 A | | 4/1974 | Afanador et al. | |
| 3,905,089 A | * | 9/1975 | Osenbaugh et al. | 29/434 |
| 4,168,086 A | | 9/1979 | Dick et al. | |
| 4,192,396 A | | 3/1980 | Austermann, Jr. et al. | |
| 4,271,922 A | | 6/1981 | Kishline | |
| 4,693,487 A | | 9/1987 | Cooper | |
| 4,807,939 A | | 2/1989 | Sasa | |
| 4,843,906 A | * | 7/1989 | Kuwahara | 74/607 |
| 4,915,536 A | | 4/1990 | Bear et al. | |
| 5,303,985 A | | 4/1994 | Barnholt et al. | |
| 5,647,683 A | * | 7/1997 | Easley | 403/359.6 |
| 5,655,418 A | * | 8/1997 | Barnholt | 74/607 |
| 5,664,847 A | * | 9/1997 | Bear et al. | 301/137 |
| 5,713,247 A | * | 2/1998 | Skelton et al. | 74/607 |
| 5,979,271 A | | 11/1999 | Louis et al. | |
| 6,267,198 B1 | | 7/2001 | Hurlburt et al. | |
| 6,322,061 B1 | | 11/2001 | Maser et al. | |
| 6,345,712 B1 | * | 2/2002 | Dewald et al. | 192/221 |
| 6,450,914 B1 | | 9/2002 | Irwin et al. | |
| 6,533,697 B2 | * | 3/2003 | Morse et al. | 475/230 |
| 6,569,053 B2 | * | 5/2003 | Hirao et al. | 475/246 |
| 6,609,649 B1 | | 8/2003 | Barnholt et al. | |

FOREIGN PATENT DOCUMENTS

| | | | |
|---|---|---|---|
| GB | 2124166 A | * | 2/1984 |
| GB | 2257402 A | * | 1/1993 |

\* cited by examiner

*Primary Examiner*—Frantz F. Jules
(74) *Attorney, Agent, or Firm*—Miller, Canfield Paddock and Stone; Robert K. Roth

(57) ABSTRACT

An axle assembly serves as a primary structural member for a motor vehicle and comprises an axle tube having a first end and a second end and with an opening located near the first end and a mounting module formed as a unitary extension of the axle tube. At least one steel insert is positioned near the first end, and the steel insert is adapted to be welded to a differential carrier to secure the axle tube to the differential carrier. The axle assembly may also have an axle tube formed unitary with the differential carrier.

12 Claims, 5 Drawing Sheets

AXLE ASSEMBLY

FIELD OF THE INVENTION

This invention relates to improvements in axle assemblies, and more particularly to improvements in motor vehicle axle assemblies.

BACKGROUND OF THE INVENTION

Axles are used as main supports for tire assemblies and other components in motor vehicles. The tires are mounted at each end of the axle, and other items such as shock absorbers, jounce bumpers, differential carriers, stay bars, yokes, and control arms, etc. are attached to the axle, often by welding several components together. Common automotive axle assemblies are referred to as Salisbury designs. With this type of axle assembly, an axle tube is formed of steel and pressed into each one of a pair of differential carrier trunnions made of ductile iron, with each tube being plug welded to the carrier through radially extending holes formed in the corresponding carrier trunnion. Thus, known automotive axle assemblies are fairly complex, with numerous mounting and structural components fastened and welded together. Such complexity increases costs, adds to manufacturing time, and has the potential to introduce some tolerance and alignment concerns.

It has been suggested that forming the axle assembly of ductile iron through a lost foam process may alleviate some of these concerns. However, practical engineering constraints have kept such designs from being commercialized, including, for example, the fact that ductile iron is difficult to weld (to the differential carrier, for example). Further, lost foam processes have not been used as it was thought that components as large and complex as axle assemblies could not be made efficiently due to high temperatures of some materials, the increased difficulty in controlling vent pressure during the mold process, etc. It would be highly desirable to provide an axle tube assembly which is less expensive, easier to assemble and lighter than known axle tube assemblies which incorporates as many parts as possible into a single axle assembly.

SUMMARY OF THE INVENTION

In accordance with a first aspect, an axle assembly serves as a primary structural member for a motor vehicle and comprises an axle tube having a first end and a second end and a mounting module formed as a unitary extension of the axle tube. At least one steel insert is positioned near the first end, and the steel insert is adapted to be welded to a differential carrier to secure the axle tube to the differential carrier. The axle assembly may also have an axle tube formed unitary with the differential carrier.

From the foregoing disclosure and the following more detailed description of various preferred embodiments it will be apparent to those skilled in the art that the present invention provides a significant advance in the technology of axle assemblies. Particularly significant in this regard is the potential the invention affords for providing a high quality, low cost incorporating numerous elements into one molded part. Additional features and advantages of various preferred embodiments will be better understood in view of the detailed description provided below.

Figure 1:
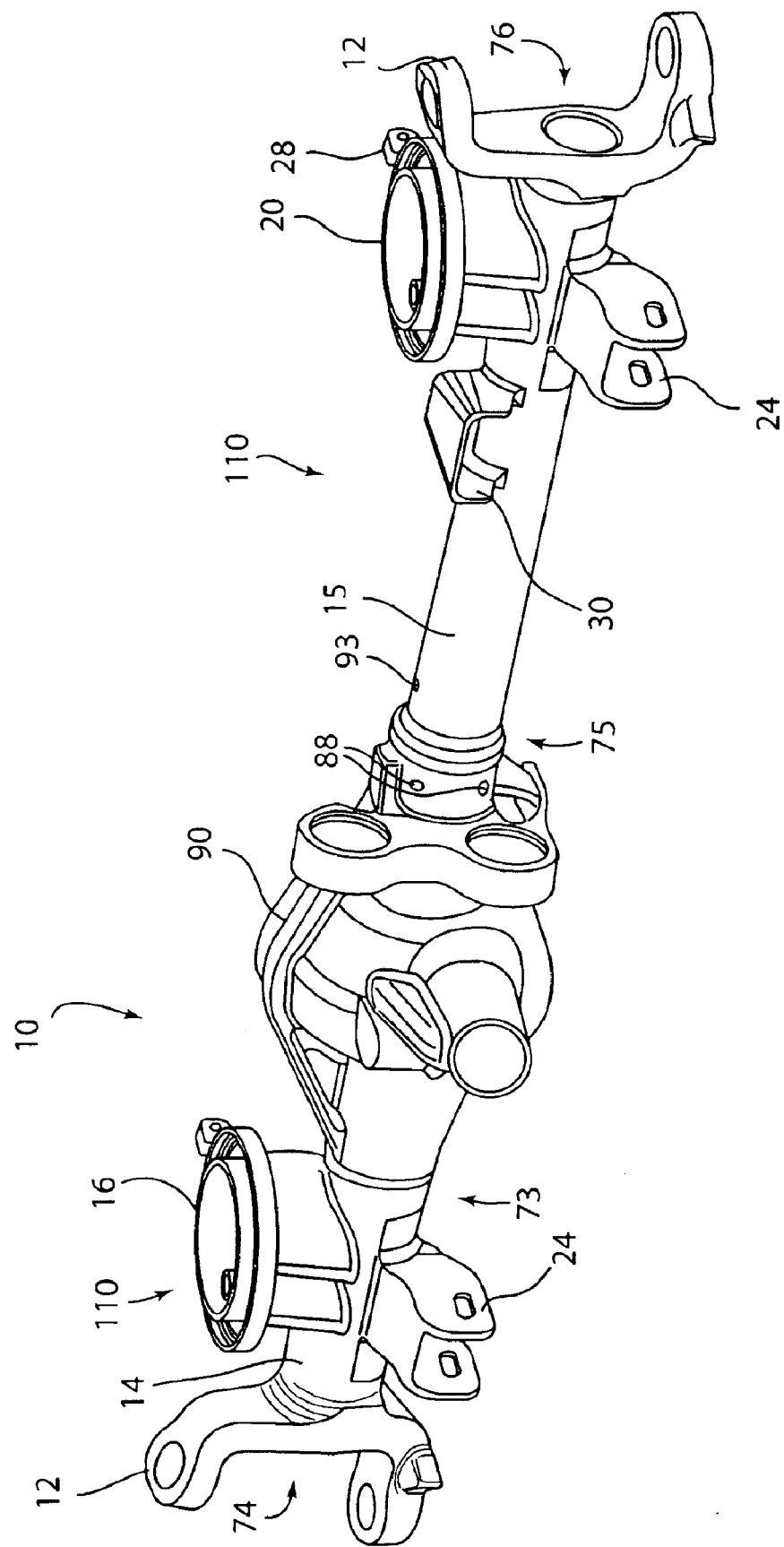
FIG. 1 is a perspective view of an axle assembly in accordance with a preferred embodiment, showing left and right axle assemblies connected to a differential.

It should be understood that the appended drawings are not necessarily to scale, presenting a somewhat simplified representation of various preferred features illustrative of the basic principles of the invention. The specific design features of the axle assembly as disclosed here, including, for example, the specific dimensions of the steel insert, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the axle assembly disclosed here. The following detailed discussion of various alternative and preferred features and embodiments will illustrate the general principles of the invention with reference to an axle assembly suitable for use in automotive applications. Other embodiments suitable for other applications will be apparent to those skilled in the art given the benefit of this disclosure.

Figure 2:
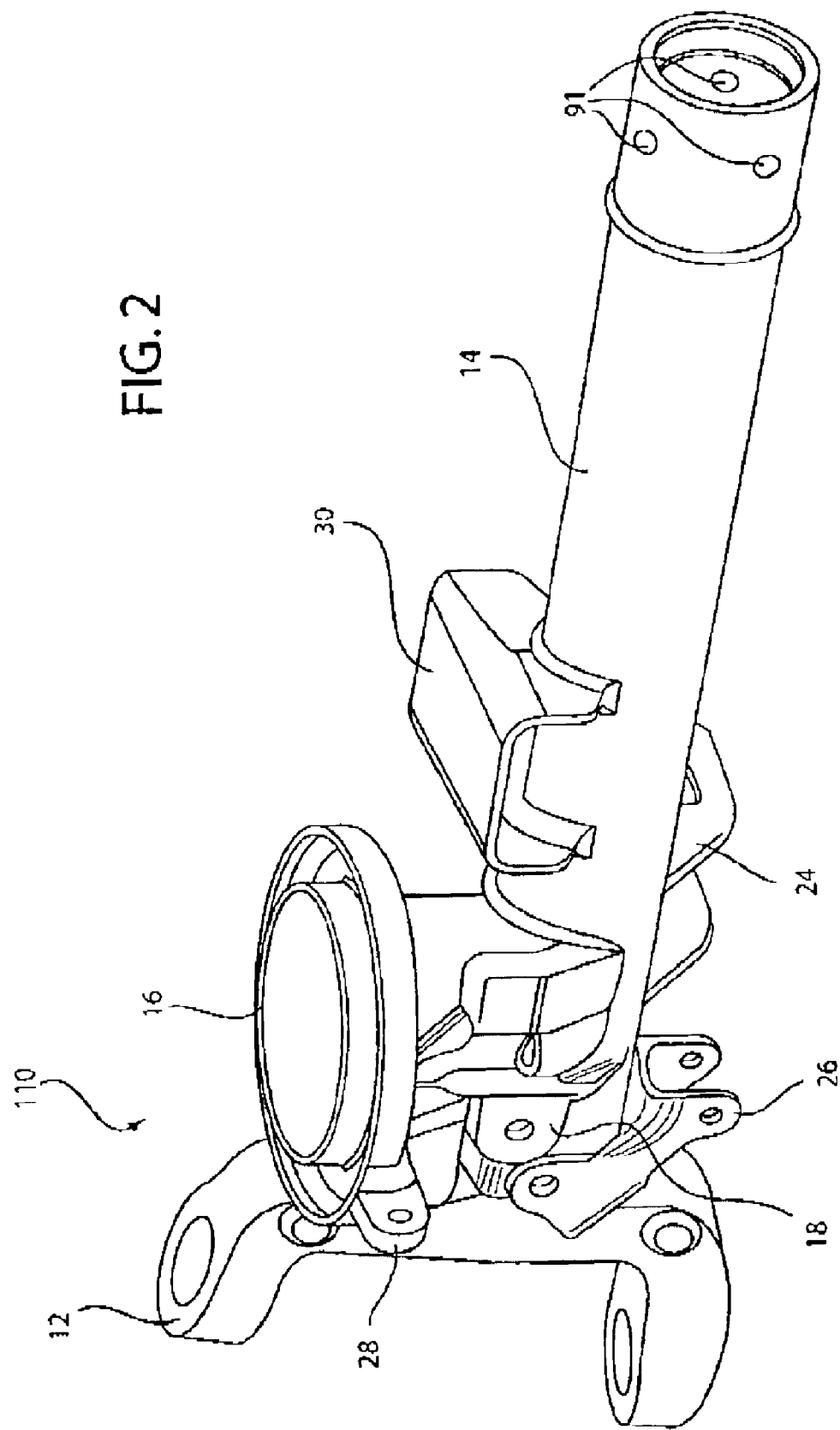
FIG. 2 is a perspective view of the left axle assembly of FIG. 1
Figure 3:
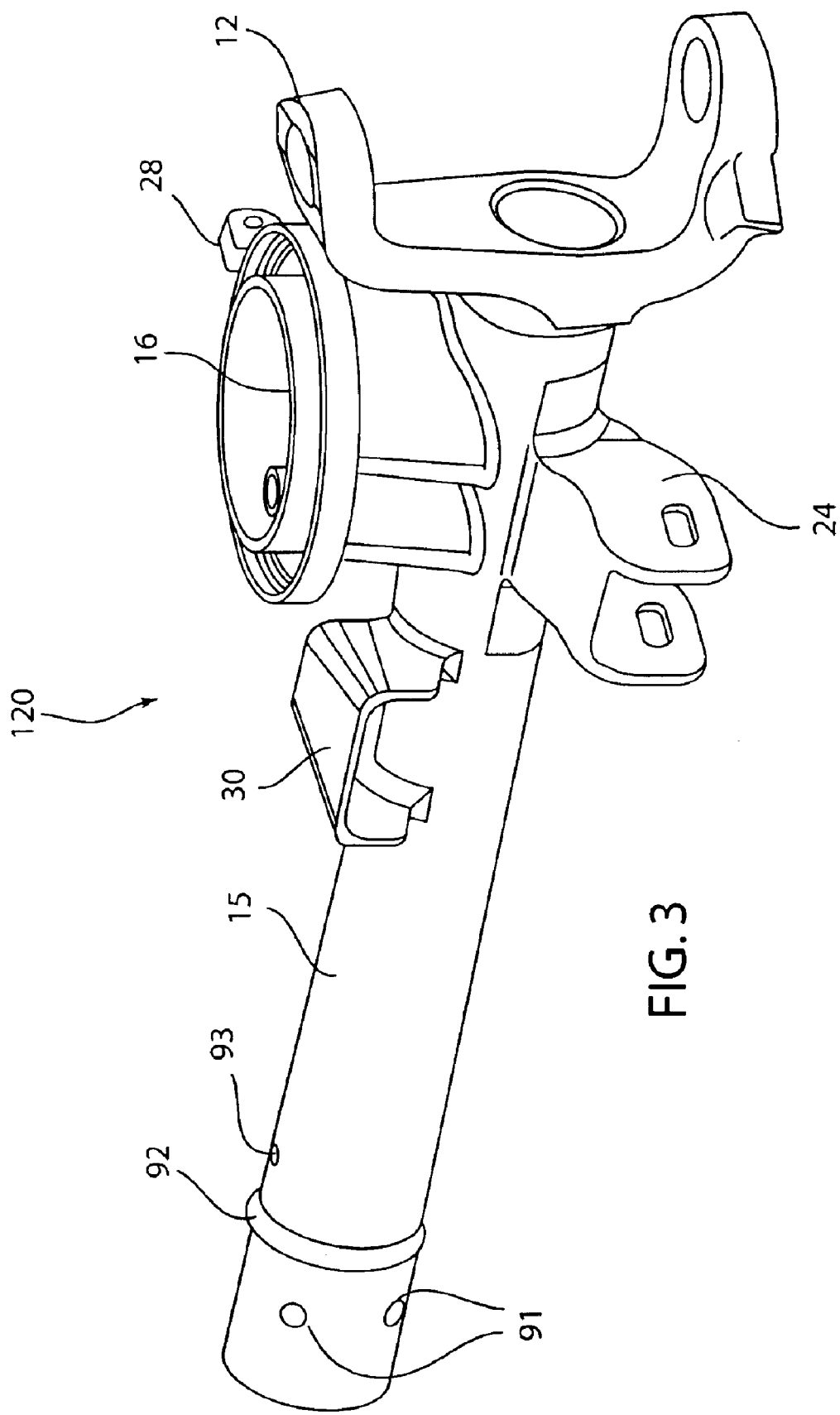
FIG. 3 is a perspective view of the right axle assembly of FIG. 1

Referring now to the drawings, in FIG. 1 shows an axle 10 in accordance with a preferred embodiment comprising left and right axle assemblies 120, 110 having corresponding axle tubes 14, 15 which are connected to a differential carrier 90. The differential carrier may be formed of ductile iron, aluminum or steel, for example. FIG. 2 shows the right side axle assembly 110 and FIG. 3 shows the left axle assembly 120. In this preferred embodiment, each of the axle assemblies may be connected to the differential carrier at a corresponding first end 75, 73 of each axle tube 15, 14, respectively. A kingpin yoke 12 is shown formed as a unitary extension of the axle tubes at corresponding second ends 76, 74. In accordance with a highly advantageous feature, the axle tubes are formed unitary with any one or more of numerous mounting brackets, forming a low cost structural mounting module to which many different motor vehicle components can be attached. Reference herein to the axle assembly in preferred embodiments as one-piece or unitary is intended to mean that the axle assembly is formed of a single, seamless body of material. Similarly, reference to features or elements, such as the kingpin yoke, shock absorber attachment bracket, etc., as being "unitary" defines them as part of the single seamless body of material forming the axle assembly, generally as protrusions, recesses and like formations.

Unitary mounting modules which can be incorporated as a single piece with the axle tubes are numerous and can comprise, for example, a yoke, such as a kingpin yoke 12, a shock absorber attachment bracket 16, a stay bar attachment bracket 28, an upper control arm attachment bracket 22

(shown in the embodiment in FIG. 4 as a unitary extension from the differential carrier 190), a lower control arm attachment bracket 24, a spring seat 20 which could be for a coil spring, a leaf spring, or an air spring, for example, a jounce bumper bracket 30, a steering damper attachment bracket 26 (seen in FIG. 2), and a track bar attachment bracket 18. Of course, such bracketry need not be formed unitary with the axle tube in combination with all of the other brackets, and some bracketry may not exist on some models of axle. Other elements suitable for incorporation into the mounting module will be readily apparent to those skilled in the art given the benefit of this disclosure and can comprise a steering stabilizer bracket, McPherson strut attachment bracket, a torsion bar attachment bracket, a coil spring over shock absorber bracket, a pinion nose bracket, a lateral link or longitudinal link/control arm attachment bracket, a panhard rod bracket, a trailing link attachment bracket, a damper bracket, a parking brake bracket, a height sensor attachment bracket, or a load sensing brake pressure attachment bracket.

The unitary axle assembly may be cast using a lost foam process. In the lost foam process, a foam pattern having the geometry of the desired part is created, coated with a refractory and then placed in a container or flask and surrounded by sand. Molten metal is then poured into the foam, which melts and vaporizes the foam, leaving a replica of the foam. This can then be machined as required to produce the final part. Access holes 93 may be provided in the components to assist in the casting process. The lost foam process is highly advantageous in many ways. For example combining multiple parts into one can reduce overall mass, enhance vibration damping characteristics, allow for better dimensional consistency, eliminates assembly processes such as welding, and enhance stiffness. Further, various components may be inserted into the mold so as to form an integral assembly. For example, in some preferred embodiments the axle tubes 14, 15 and unitary mounting modules may be formed of, for example, ductile iron. It is difficult to weld ductile iron parts together, as is the case where the differential carrier is formed of ductile iron as well.

In accordance with a highly advantageous feature designed to overcome this problem, the first ends of each axle tube 14, 15 are provided with at least one steel insert 91, positioned between the corresponding end and spacer 92, and the differential carrier 90 is provided with corresponding openings 88. In the preferred embodiment shown in the drawings, three steel inserts are provided. When the differential carrier and the axle tubes are assembled together the steel inserts 91 align with the openings 88, where the steel inserts can be welded to the ductile iron differential carrier. Preferably the steel inserts are insert molded into to the axle assembly.

Figure 4:
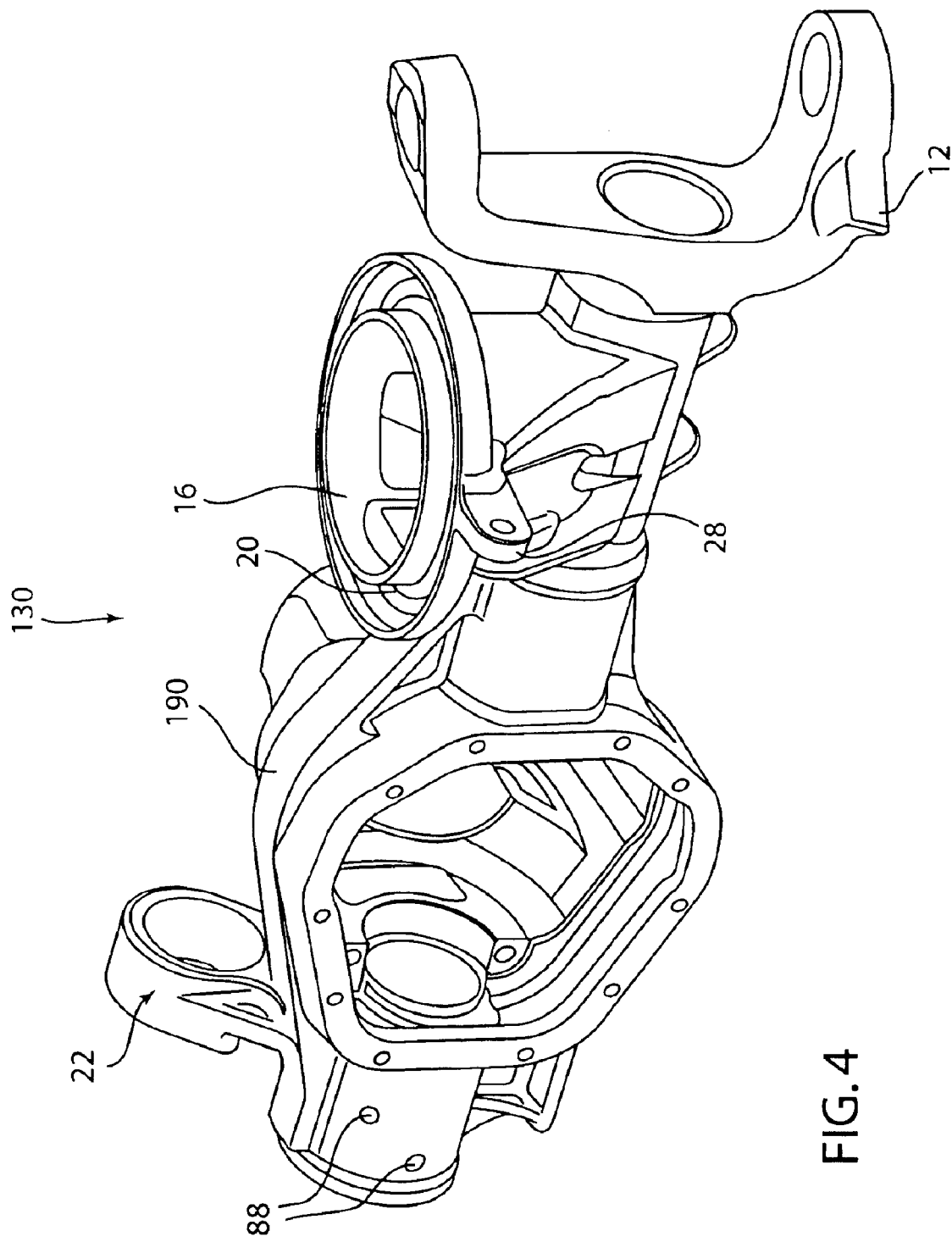
FIG. 4 is a perspective view of an alternate preferred embodiment of an axle assembly where the differential carrier is formed unitary with an axle tube.
Figure 5:
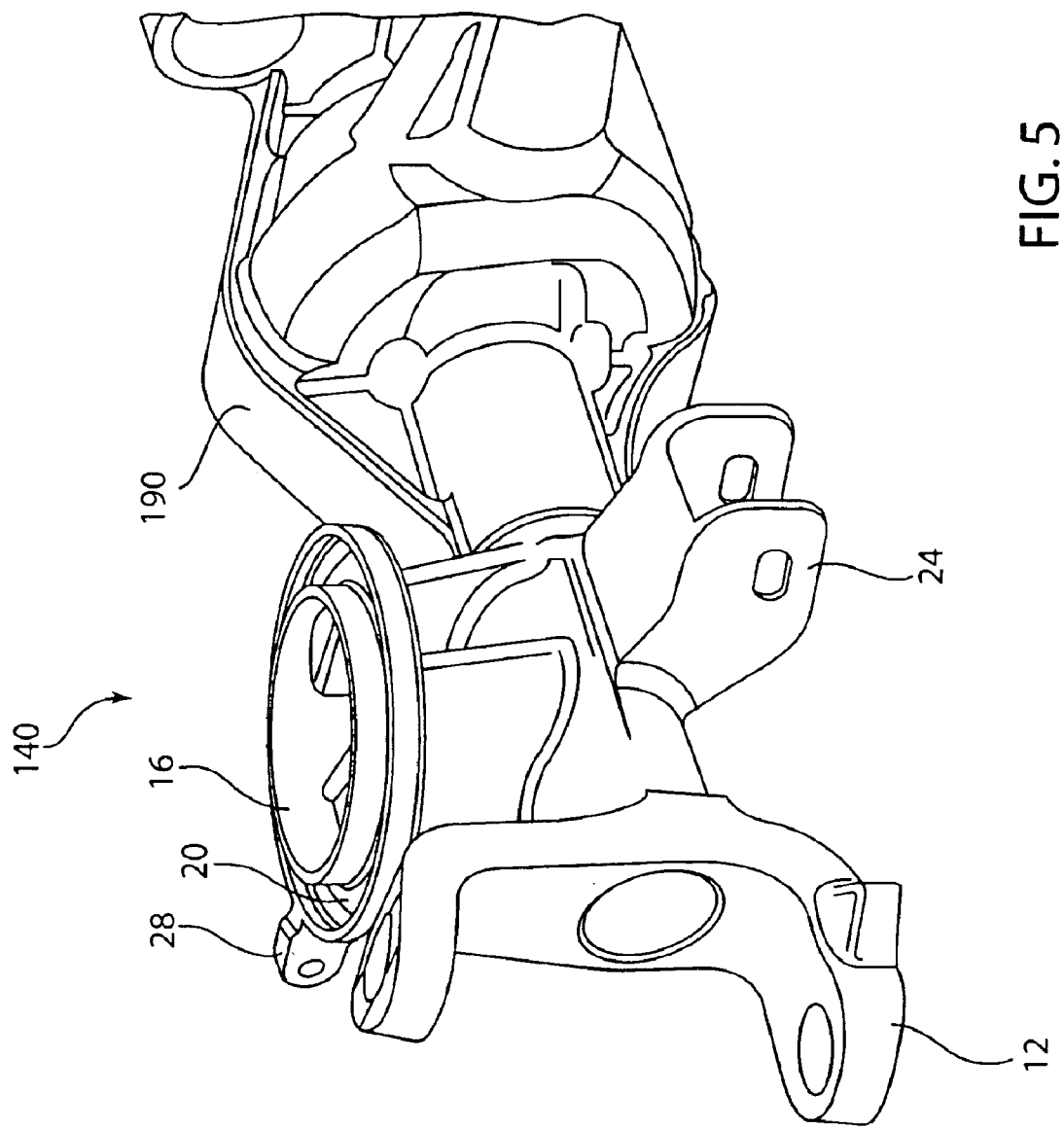
FIG. 5 is another perspective view of the axle of assembly of FIG. 4.

FIGS. 4 and 5 show an alternate preferred embodiment with even fewer separate components that the above described embodiments. Left 140 and right 130 axle assemblies are provided, and here axle assembly 130 and the differential carrier 190 are formed as a unitary, one-piece construction, again preferably by making use of the lost foam process. In this preferred embodiment, the axle tube, mounting module and differential carrier can all be formed of ductile iron, for example. The other axle assembly 140, may be attached to the differential carrier by one of various suitable methods, including using steel inserts 91 and alignment holes 88 in the differential carrier 190.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An axle assembly comprising, in combination:
    an axle tube having a first end and a second end;
    a mounting module formed as a unitary extension of the axle tube; and
    at least one steel insert positioned near the first end of the axle tube, wherein the at least one steel insert is adapted to be welded with a differential carrier to secure the axle tube to the differential carrier;
    wherein the axle tube has an axis between the first end and the second end, and the mounting module comprises at least a yoke having a yoke having a pair of openings formed generally perpendicular to the axis of the axle tube, and the yoke is a unitary extension of the axle tube near the second end.

2. The axle assembly of claim 1 wherein the differential carrier comprises one of ductile iron and aluminum.

3. The axle assembly of claim 1 wherein the mounting module comprises at least one of a yoke, a shock absorber attachment bracket, a stay bar attachment bracket, an upper control arm attachment bracket, a lower control arm attachment bracket, a spring seat, a jounce bumper bracket, a steering damper attachment bracket, and a track bar attachment bracket.

4. The axle assembly of claim 3 wherein the mounting module is formed unitary with the axle in a lost foam process.

5. The axle assembly of claim 1 wherein the first end of the axle tube is press fit into an opening in the differential carrier.

6. The axle assembly of claim 1 further comprising three steel inserts spaced around the first end which can be aligned with corresponding openings in the differential carrier and weld material is positioned in the corresponding openings to secure the axle assembly to the differential carrier.

7. An axle assembly comprising, in combination:
    an axle tube having a first end and a second end;
    a mounting module formed as a unitary extension of the axle tube; and
    at least one steel insert positioned near the first end of the axle tube, wherein the at least one steel insert is adapted to be welded with a differential carrier to secure the axle tube to the differential carrier;
    wherein the axle tube comprises ductile iron.

8. An axle assembly comprising, in combination:
    an axle tube having an axis between a first end and a second end and adapted to provide structural support to a motor vehicle;
    a yoke formed unitary with the axle tube, having a pair of openings formed generally perpendicular to the axis of the axle tube; and
    a differential carrier adapted to provide a structural support for a gear transmission of the motor vehicle and formed as a unitary extension of the axle tube;

wherein the differential carrier is formed as a unitary extension of the axle tube near the first end, and the yoke is formed as a unitary extension of the axle tube near the second end.

9. The axle assembly of claim 8 further comprising a second axle tube having a first end and a second end, wherein the first end of the second axle tube axle tube is secured to the differential carrier.

10. The axle assembly of claim 9 wherein each axle tube has a corresponding mounting module formed unitary therewith, each mounting module comprising at least one of a yoke, a shock absorber attachment bracket, a stay bar attachment bracket, an upper control arm attachment bracket, a lower control arm attachment bracket, a spring seat, a jounce bumper bracket, a steering damper attachment bracket, and a track bar attachment bracket.

11. The axle tube assembly of claim 9 wherein the unitary axle tube and differential carrier are formed unitary in a lost foam process.

12. The axle tube assembly of claim 9 wherein the axle tube and unitary differential carrier are formed from ductile iron.

* * * * *